W. SCHNEIDER.
Basket.
No. 215,168. Patented May 6, 1879.
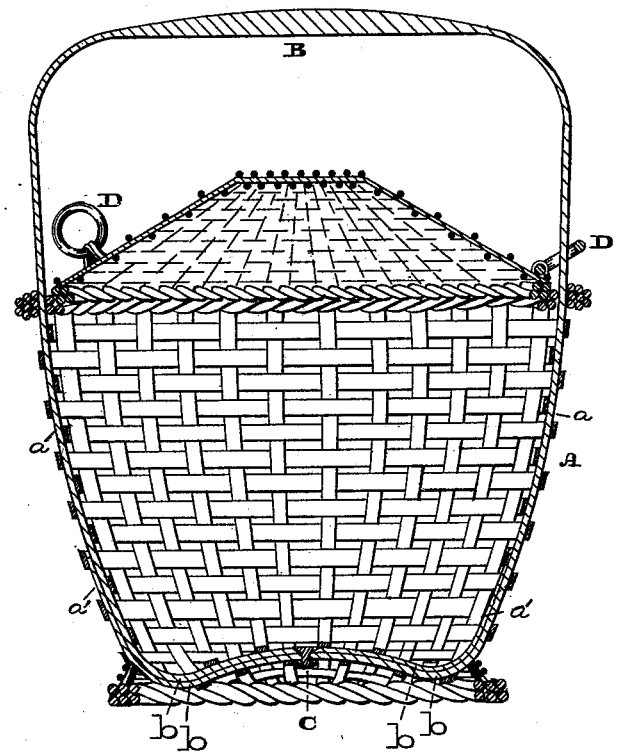
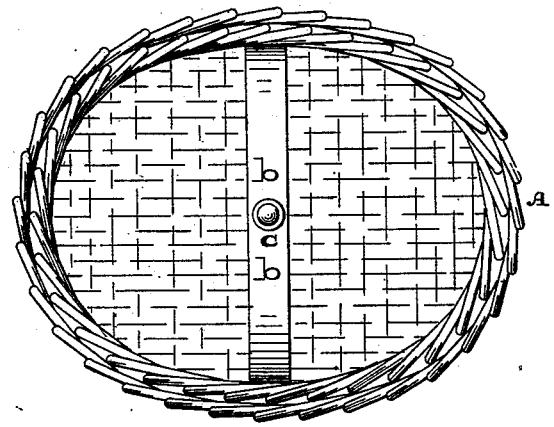
Witnesses:
A. P. Grant,
W. F. Kircher
Inventor:
Wm. Schneider,
by John A. Wiedersheim
ATTORNEY.

UNITED STATES PATENT OFFICE.

WILLIAM SCHNEIDER, OF PHILADELPHIA, PENNSYLVANIA.

IMPROVEMENT IN BASKETS.

Specification forming part of Letters Patent No. 215,168, dated May 6, 1879; application filed March 10, 1879.

*To all whom it may concern:*

Be it known that I, WILLIAM SCHNEIDER, of the city and county of Philadelphia, and State of Pennsylvania, have invented a new and useful Improvement in Baskets, which improvement is fully set forth in the following specification and accompanying drawings, in which—

Figure 1 is a vertical section of the basket embodying my invention. Fig. 2 is a bottom view thereof.

Similar letters of reference indicate corresponding parts in the two figures.

My invention consists of the handle, which is passed continuously around the sides and bottom of the basket, and has two lengths or thicknesses riveted to the bottom, whereby a securely attached handle and strong basket are produced.

Referring to the drawings, A represents a basket, which is of usual form and construction. B represents the handle, which is formed of a strip of wood or metal, which, instead of terminating at the sides of the basket, as heretofore practiced, is passed entirely down the sides, as at $a$, and entirely across the bottom, as at $b$, and then again partly up the sides, as at $a'$, thus forming two lengths or thicknesses, $b\ b$, at the bottom, and two lengths or thicknesses, $a\ a'$, at the lower portions of the sides.

Through the two bottom lengths, $b\ b$, at the middle thereof, there is passed a rivet, $c$, which is properly headed, and clamps said lengths $b$ to the bottom and unites the ends of the handle.

It will be seen that the handle extends, as it were, continuously around the sides and bottom and above the body of the basket, so that it is securely attached to the body without liability of being drawn out, and forms a brace for said sides and bottoms.

Furthermore, the two lengths $b\ b\ a\ a'$ correspondingly strengthen the bottom and sides of the basket at relative places, so that the basket is prevented from bulging at the sides or breaking through the bottom, the advantages whereof are evident.

Rings D, of bone or other rigid material, are secured by loops to the lid, for the purpose of connecting it to the handle, and convenience of opening and closing.

Having thus described my invention, what I claim as new and desire to secure by Letters Patent, is—

The handle B, passed continuously around the sides and doubly across the entire width of the bottom of the basket, and connected thereto by one or more rivets passed through the two lengths into the bottom, substantially as and for the purpose set forth.

WM. SCHNEIDER.

Witnesses:
JOHN M. MAENMER,
JOHN A. WIEDERSHEIM.